Oct. 13, 1925.
K. G. KARSTEN
1,556,609
MAP
Filed April 3, 1923
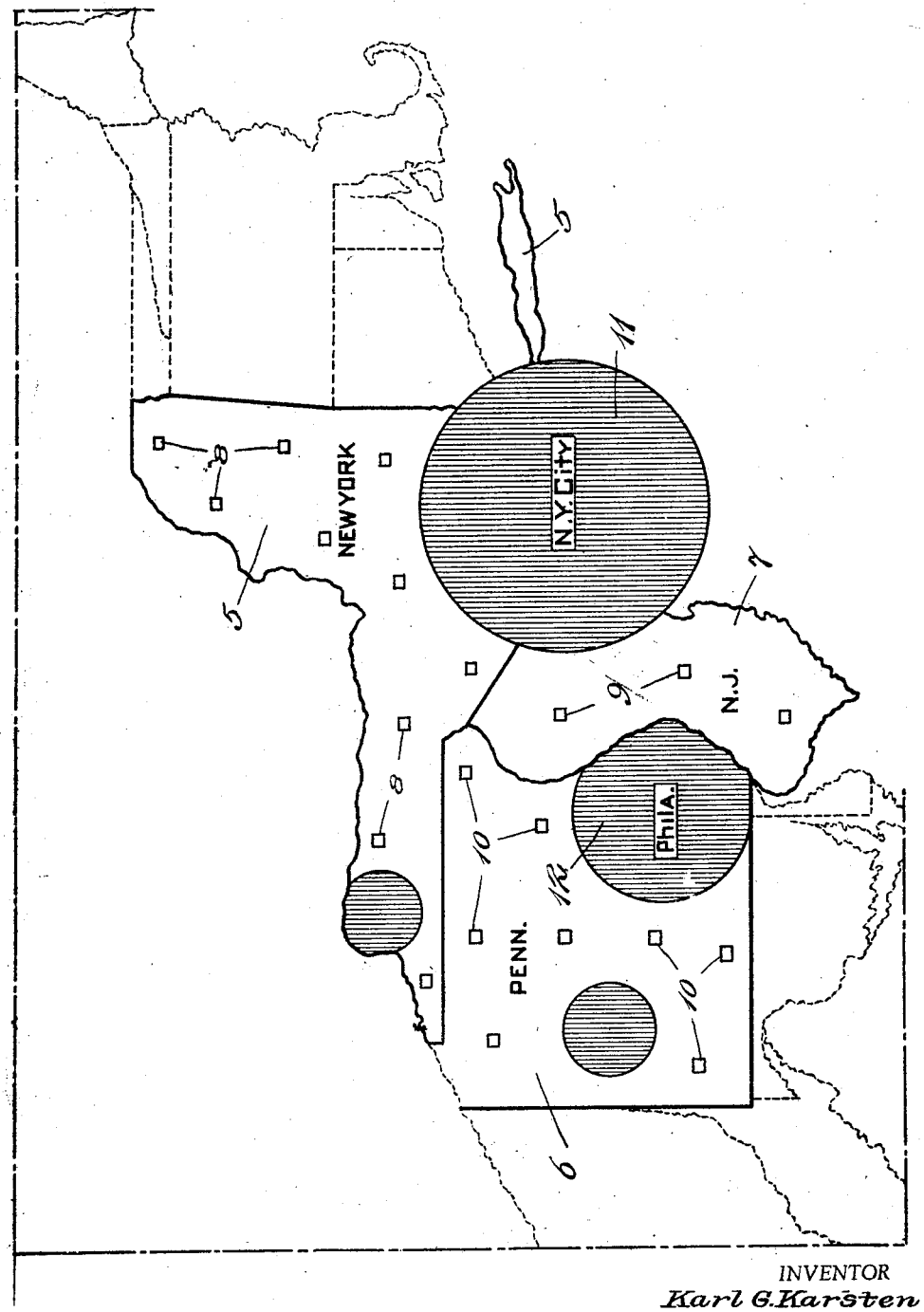
INVENTOR
*Karl G. Karsten*
BY
*Warren S. Oxtow*
ATTORNEYS Patented Oct. 13, 1925.

1,556,609

UNITED STATES PATENT OFFICE.

KARL G. KARSTEN, OF NEW YORK, N. Y.

MAP.

Application filed April 3, 1923. Serial No. 629,569.

*To all whom it may concern:*

Be it known that I, KARL G. KARSTEN, a citizen of the United States, and resident of New York, in the county of New York and State of New York, have invented certain new and useful Improvements in Maps, of which the following is a specification.

This invention relates to maps for graphically displaying the relative importance of various geographical units upon the basis of population, or any factor other than total land area, of such units, the map being formed by distorting boundaries to make the included map surface correspond in area with the value of such unit upon such basis without losing familiar and significant features of the unit outline.

An important object of the invention is to provide a means to facilitate the study of comparative values of different States, counties, or other geographical or political units or divisions, with regard to population, wealth, natural resources, or any other factor other than total land area, the present basis of map projection.

Another object of the invention is to provide a means to facilitate the study of distribution or location of distributing points, branch houses, supply stations, or other points, with reference to population, wealth, resources, or other factors except total land area, in different States, counties or other geographical or political units.

The map embodying my invention is made by drawing the various States, counties or geographical or political units or divisions out of true proportion, on such projection as will increase total land area by the actual density coefficient of value with respect to population, wealth, resources, or any other factor except total land area, thus making the map surface of such units correspond in area with the total value of such unit as regards population, wealth, or other factor except total land value, such projection being so applied as to preserve and retain familiar, significant, and recognizable features of the boundaries or outlines of such units, sufficiently to make the units recognizable and approximately characteristic, while distorting them sufficiently to make their size or map surface accurately correspond in area with value as aforesaid. Thus while outlines upon such a map are distorted, they are not distorted more than is necessary for the accurate representation of value. And such a map therefore differs from accustomed maps in that while the latter is drawn to represent square miles or other measurement of total land area, such a map is drawn to represent and correspond with the actual value of any factor other than total land area.

There are several methods of producing such a map, any and all of which are covered by the appended claims with respect to purpose and function. For precise purposes the drafting instrument known as the planimeter will verify the map area after tentative drawing. For rough purposes cross-ruled paper in which each square on the paper is taken to represent a certain quantity in the value of the factor used for representation, will be sufficiently accurate, and the map surface may be measured by counting squares and parts of squares so contained after tentative drawing. In large maps plastic clay or other pliable substance may be used, a portion of clay being taken for each unit which will correspond, when measured or weighed, with the value of the factor, the clay or other substance of different colors being used for different units or divisions, and modeled into the familiar outlines and flattened to uniform thickness, and a copy of the whole, when completed, being made by photograph or tracing paper or other means. For study of distribution, map-pins, labels, tags, circles, dots, or other marks may be made upon the map embodying my invention, at points thereon. These instances of drafting are cited to show how a density-projection map may be obtained, the map itself, as a process in graphic presentation, and as a means to graphically display values, and to the study of values other than total land area, and as a means to the study of distribution in respect to any factor other than total land area, being the subject of this petition.

In the drawing which is intended as a graphic representation of the States New York, New Jersey and Pennsylvania, the numeral 5 indicates the distorted boundary of New York and the numerals 6 and 7 indicate respectively the distorted boundaries of Pennsylvania and New Jersey. The map area included within the boundary lines 5, 6 and 7 of the respective States New York, Pennsylvania and New Jersey bear a proper relation to each other with respect to the respective population of these States. It will further be noted that the boundaries of these several States have been distorted without destroying the familiar and significant features of their true geographical outlines. In projecting the map embodying my invention the actual land area of a given territory is not taken into consideration as a factor. The only factor to be considered in distorting the boundaries of several given territories when projecting a map embodying my invention is that factor with which one is particularly concerned. For example: should the population be the selected factor then the relative ultimate areas of the distorted territories is determined by the relative population of the several territories. Again should the value of the natural resources (as iron ore) be the selected factor then the relative ultimate areas of the distorted territories is determined by the relative value of the natural resources of the several territories. The uses to which the map embodying my invention may be put are innumerable. I therefore deem it necessary to elaborate on only one of these many uses. To make its application clear let us suppose that an industrial enterprise desires to distribute sales stations throughout the States of New York, Pennsylvania and New Jersey, in such a manner as to supply equal portions of the population from each of the several stations as indicated by the dots 8, 9 and 10 within the areas included respectively between the boundaries 5, 6 and 7, these areas representing respectively New York, Pennsylvania and New Jersey. By actual plotting since the given areas are represented according to their relative population the stations as indicated at 8, 9 and 10 may be evenly distributed throughout these given territories thus designating at a glance in which locality of a given territory each of the stations should be located.

In use, I desire to indicate by the area of circles the relative population of one city with respect to another. In the drawing I have shown circles 11 and 12, the areas of which represent respectively the population of New York city and Philadelphia. The population of New York city is approximately three times that of Philadelphia but by actually determining the ratio between the areas of the circles 11 and 12 the exact ratio of population of New York city with respect to Philadelphia may be determined. The ratio between the population of New York city and Philadelphia having been determined the ratio between the number of sales stations of New York city and Philadelphia is readily fixed. It is to be noted that the boundaries of the territories are so distorted as to provide arcs of circles around the border cities these arcs of circles being completed diagrammatically as shown by the dotted lines of the figure to form circles, the areas of which circles as hereinbefore described is dependent upon the population of a given city with respect to a second given city.

It will be noted that I have shown only two cities, namely, New York and Philadelphia, as included in the circles hereinbefore referred to. I have selected these cities because of the fact that their population is in excess of one million. It might be desired in some instances to include within the circles all of the cities having a population in excess of five hundred thousand or for other purposes it might be desirable to include within circles only those cities having a population of between say one hundred thousand and two hundred and fifty thousand.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. A map of a plurality of territories having their boundary lines so distorted as to make their included areas represent graphically the relative importance of a given factor other than land area of one area with respect to another area, the boundaries being distorted without losing their familiar and significant features certain cities of said territories indicated on said map by a geometric form having inscribed areas proportionate to the value of said factor present in said cities.

2. A map of a plurality of territories having their boundary lines so distorted as to make their included areas represent graphically the relative importance of a given factor other than land area of one area with respect to another area, a portion of a boundary line in proximity to a border city being distorted to form approximately an arc of a circle and said city being included within the circle formed in part of said arc.

3. A map of a plurality of territories having their boundary lines so distorted as to make their included areas represent graphically the relative importance of a given factor other than land area of one area with respect to another area, a portion of the boundary line in proximity to a border city of one of the territories being distorted to form part of the outline of a regular figure, said boundary city being included within the outlines of said figure, and said boundary line being distorted without losing its familiar and significant feature.

4. A political map designed to represent approximately two known territories with their included areas representing graphically the relative importance of a given factor other than land area while maintaining somewhat their familiar appearance, and one of said territories having one of its cities indicated on said map by a form having an inscribed area proportionate to the value of said factor present in said city.

5. A map including a territory having an inscribed area representing graphically a given factor other than land area of said territory and one of the cities of said territory being represented thereon with a form having an inscribed area proportionate to the value of said factor present in said city.

6. A map of a plurality of territories having their boundry lines distorted to make their included areas represent graphically the population of the territories, while maintaining approximately the familiar outlines of the territories, certain cities in said territories being represented graphically by similarly shaped forms and having inscribed areas proportionate to the population of the several cities.

KARL G. KARSTEN.